US007346017B2

(12) United States Patent
Huckins et al.

(10) Patent No.: US 7,346,017 B2
(45) Date of Patent: Mar. 18, 2008

(54) PARTIALLY INTEGRATING WIRELESS COMPONENTS OF PROCESSOR-BASED SYSTEMS

(75) Inventors: Jeffrey L. Huckins, Chandler, AZ (US); Siripong Sritanyaratana, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 1109 days.

(21) Appl. No.: 10/091,328

(22) Filed: Mar. 5, 2002

(65) Prior Publication Data

US 2003/0171138 A1  Sep. 11, 2003

(51) Int. Cl.
*G08C 17/00* (2006.01)
(52) U.S. Cl. ...................................... 370/311
(58) Field of Classification Search ............... 370/463, 370/503, 311; 713/300
See application file for complete search history.

(56) References Cited

U.S. PATENT DOCUMENTS

| | | | | |
|---|---|---|---|---|
| 5,802,305 A | * | 9/1998 | McKaughan et al. | 709/227 |
| 6,047,378 A | * | 4/2000 | Garrett et al. | 713/300 |
| 6,192,230 B1 | * | 2/2001 | van Bokhorst et al. | 455/343.3 |
| 6,285,406 B1 | * | 9/2001 | Brusky | 348/552 |
| 6,421,782 B1 | * | 7/2002 | Yanagisawa et al. | 726/4 |
| 6,493,824 B1 | * | 12/2002 | Novoa et al. | 709/203 |
| 6,496,869 B1 | * | 12/2002 | Cheng | 709/250 |
| 6,564,056 B1 | * | 5/2003 | Fitzgerald | 455/435.1 |
| 6,601,180 B1 | * | 7/2003 | Paredes et al. | 713/323 |
| 6,698,654 B1 | * | 3/2004 | Zuppicich | 235/380 |
| 6,795,450 B1 | * | 9/2004 | Mills et al. | 370/463 |
| 6,947,768 B2 | * | 9/2005 | Adachi et al. | 455/560 |
| 6,956,834 B2 | * | 10/2005 | Stanwood et al. | 370/329 |
| 6,972,718 B2 | * | 12/2005 | Watanabe et al. | 342/387 |
| 7,082,129 B2 | * | 7/2006 | Cromer et al. | 370/389 |
| 2003/0097398 A1 | * | 5/2003 | Knox et al. | 709/203 |

\* cited by examiner

*Primary Examiner*—Anh-Vu Ly
(74) *Attorney, Agent, or Firm*—Trop, Pruner & Hu, P.C.

(57) ABSTRACT

A capability may include a pair of functions, one of which is integrated into a platform and the other of which is only available through an add-in card. A mating manager may determine whether both functions are available and if so, coordinate the operations of those functions. As a result, platforms may be released with the capability to be augmented thereafter by those users who choose to provide the add-in cards needed to implement the capability. A wireless network capability may be partially integrated into platforms, with additional components needed to actually implement the wireless capability provided through add-in cards. The add-in card may perform wake packet filtering to avoid excessively awakening the platform.

11 Claims, 5 Drawing Sheets

US 7,346,017 B2

PARTIALLY INTEGRATING WIRELESS COMPONENTS OF PROCESSOR-BASED SYSTEMS

BACKGROUND

This invention relates generally to augmenting or updating computer platforms with wireless capabilities.

In many cases, purchasers of computer platforms, also known as processor-based systems, wish to have the latest technology. In some cases, the latest technology is not quite ready for release at the time a given platform is manufactured. In other cases, manufacturers of processor-based platforms may know of upcoming technology improvements that may or may not yet be available.

Manufacturers who would like to make those improvements available have several considerations. Firstly, manufacturers of platforms may realize that some users may not wish to incur the cost of updates, add-ons and improvements. If every technological improvement or capability were incorporated into every platform, the expense of platforms may become prohibitive for some purchasers.

Secondly, the technology may not yet be ready for release. Therefore, while a platform manufacturer may know of a new upcoming technology, the platform manufacturer may not yet be ready, willing or able to release that technology in the current platform generation. However, there may be some cases where components of the technology may be partially ready but other components needed are not yet available.

For example, wireless networking capabilities are not generally available on platforms. However, it would be desirable to make this technology available for users in the future without excessively burdening all users now, including those who will never use wireless networking.

However, to incorporate wireless networking into current platforms, before those technologies are generally accepted in the industry, may be cost ineffective. Some users may not wish to pay for the cost of wireless networking technologies, and other users may not wish to incur the cost even if those technologies become commonplace in platforms. Moreover, in some cases, all the components for implementing a given technology may not yet be available and therefore at the time of a given platform's release, only portions of the technology may be available.

Therefore, there is a need for a way to make platforms more upgradable to include wireless capabilities.

DETAILED DESCRIPTION

Figure 1:
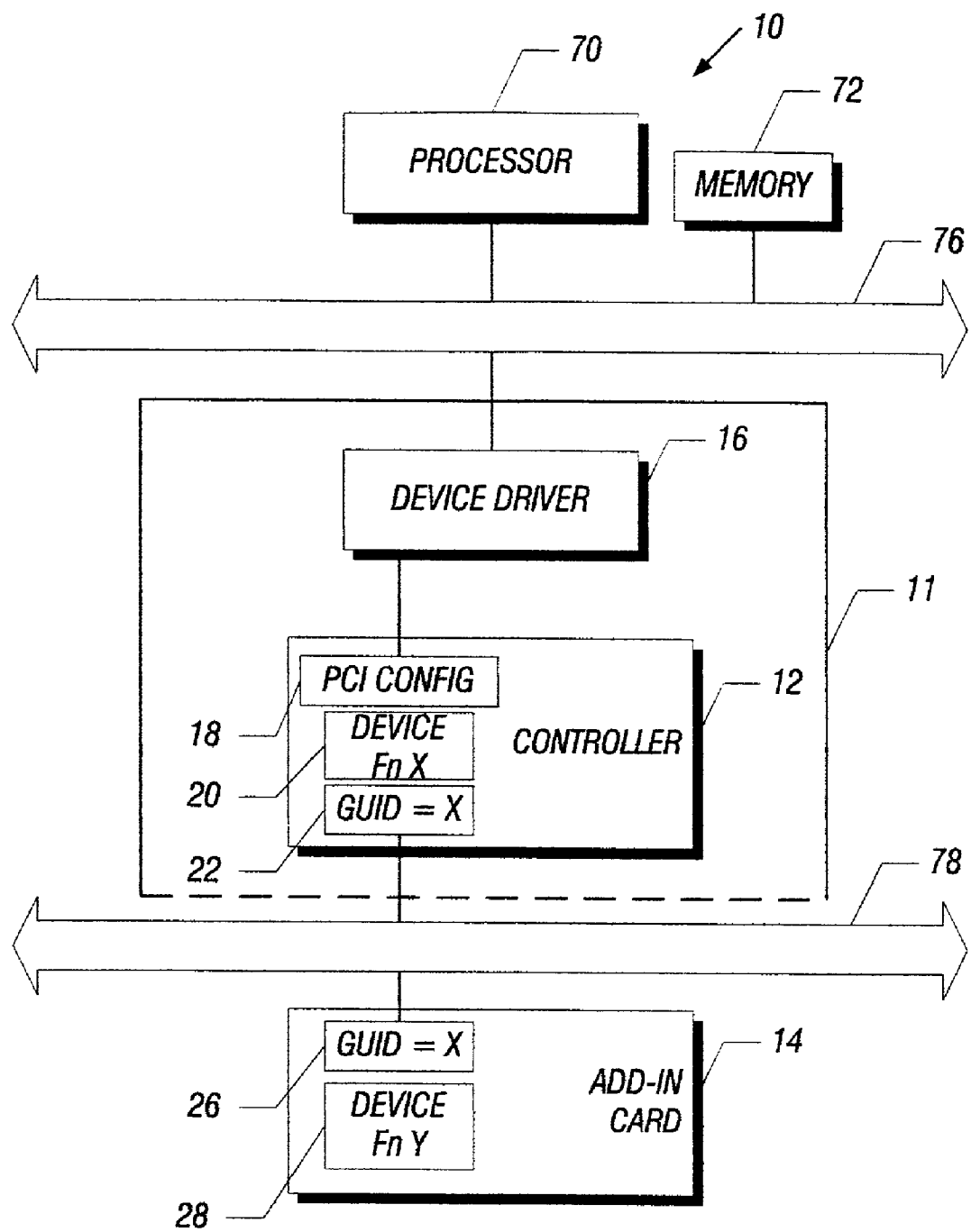
FIG. 1 is an architectural depiction of one embodiment of the present invention.

Referring to FIG. 1, a platform 10 may be a processor-based system with a bridge 11, in accordance with one embodiment of the present invention. The bridge 11 may include an integrated controller 12 that is integrated with other hardware and software to implement a function (FnX) which is part of a given capability that also includes another function (FnY).

A bus 78 may couple the bridge 11 and an add-in card 14. The add-in card 14 may provide specific components needed to achieve the function FnY via the device 28. Thus, certain capabilities for providing functions are partially integrated into the controller 11 and platform 10 while other capabilities may be provided only when an add-in card 14 is purchased and coupled to the platform 10.

The platform 10 may include a host bus 76 that couples a processor 70, a memory 72 and the bridge 11 in one embodiment. Other platform architectures may also be used.

In general, higher layer functions may reside on the host platform 10 while the remaining lower layer functional components reside in an add-in card 14 that may be plugged into an external bus 78 as desired by the user or designer of the system 10. Generally, when distributing device functions that are traditionally tightly integrated on add-in cards across an external bus, the bus protocol supports much lower latencies that are obtainable with conventional interfaces.

The partial integration architecture shown in FIG. 1 may be implemented using a single device driver 16 for each partially integrated device such as the controller 12. That driver 16 provides configuration and input/output access to the integrated controller 12 of the platform 10. The partially integrated device driver 16 may not be aware of the underlying platform 10 architecture in some embodiments.

Figure 2:
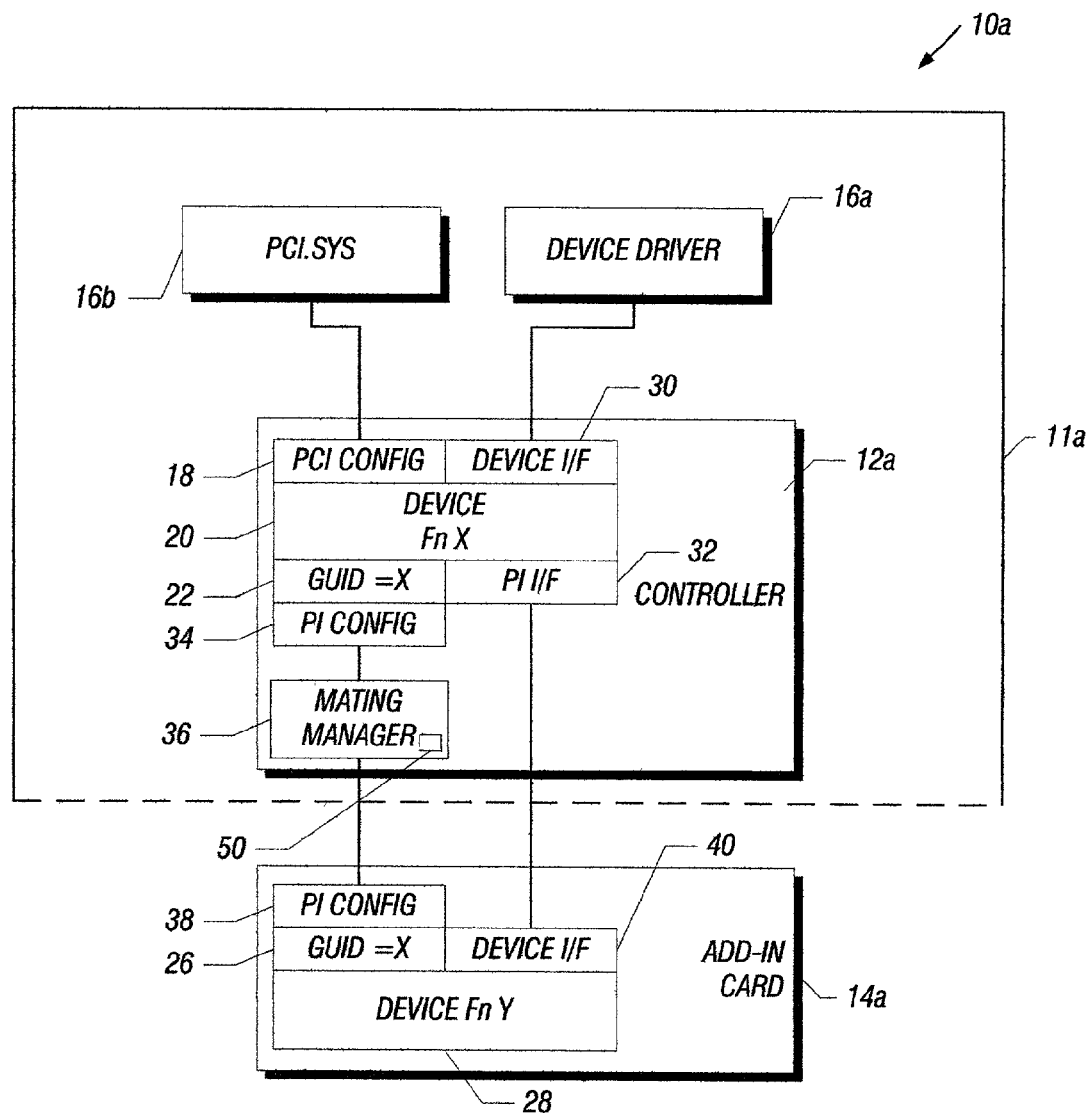
FIG. 2 is an embodiment of the device shown in FIG. 1 that operates with the peripheral component interconnect bus.

If the add-in card 14 is not found, a mating manager 36, shown in FIG. 2, provides an indication to the platform 10 that the controller 12 is nonfunctional. This discovery and notification process may be accomplished in a variety of fashions depending on specific implementations.

Referring to FIG. 2, a partially integrated component 12a in a bridge 11a interfaces with the peripheral component interface (PCI) bus 78 and includes a mating manager 36 residing within a controller 12a, in accordance with one embodiment of the present invention. The mating manager 36 implements the mating mechanism used to connect the integrated and add-in components of the partially integrated platform 10a. Implementation options for the mating manager 36 are dependent on the bus driver model implemented by the controller 12a.

In the embodiment illustrated in FIG. 2, where the controller 12a is implemented in a peripheral component interface bridge 11a, the peripheral component interface compatibility is maintained. For a peripheral component interface embodiment, the PCI.sys driver 16b is the bus driver for the controller 12a. Obviously, with other bridges utilizing other bus technologies, corresponding drivers may be used.

Advantageously, the mating manager 36 is not implemented in software in the bus driver 16b, but instead is implemented in the controller 12a hardware. In this case, the driver 16b works in conjunction with a conventional device driver 16a. The driver 16b interfaces with a PCI configuration space 18 while the device driver 16a interfaces with an interface 30. The device function FnX may be provided in the device 20. A space 22 provides information about the global unique identifier (GUID) for the integrated controller 12a. Also provided is a partial integration interface 32 that interfaces with the add-in card 14.

The global unique identifier (GUID) space 22 interfaces with a partial integration configuration space 34 also resident in the controller 12a. The mating manager 36 communicates with the partial integration configuration space 34 and a partial integration space 38 resident in the add-in card 14a. The card 14a may also include a global unique identifier (GUID) 26 and a device interface space 40 that interfaces with a corresponding interface on the controller 12a.

The add-in card 14a may include a device 28 to implement the function FnY. The mating manager 36 communicates with both the add-in card 14a and the controller 12a for discovery, enumeration and configuration. The mating manager 36 determines whether or not the add-in card 14a is present and then provides a pointer for add-in device 28 to the integrated device 20 and vice versa, by indicating where an interface, such as control registers, is mapped in memory. The devices 20 and 28 may be hardware, firmware or software modules.

Figure 3:
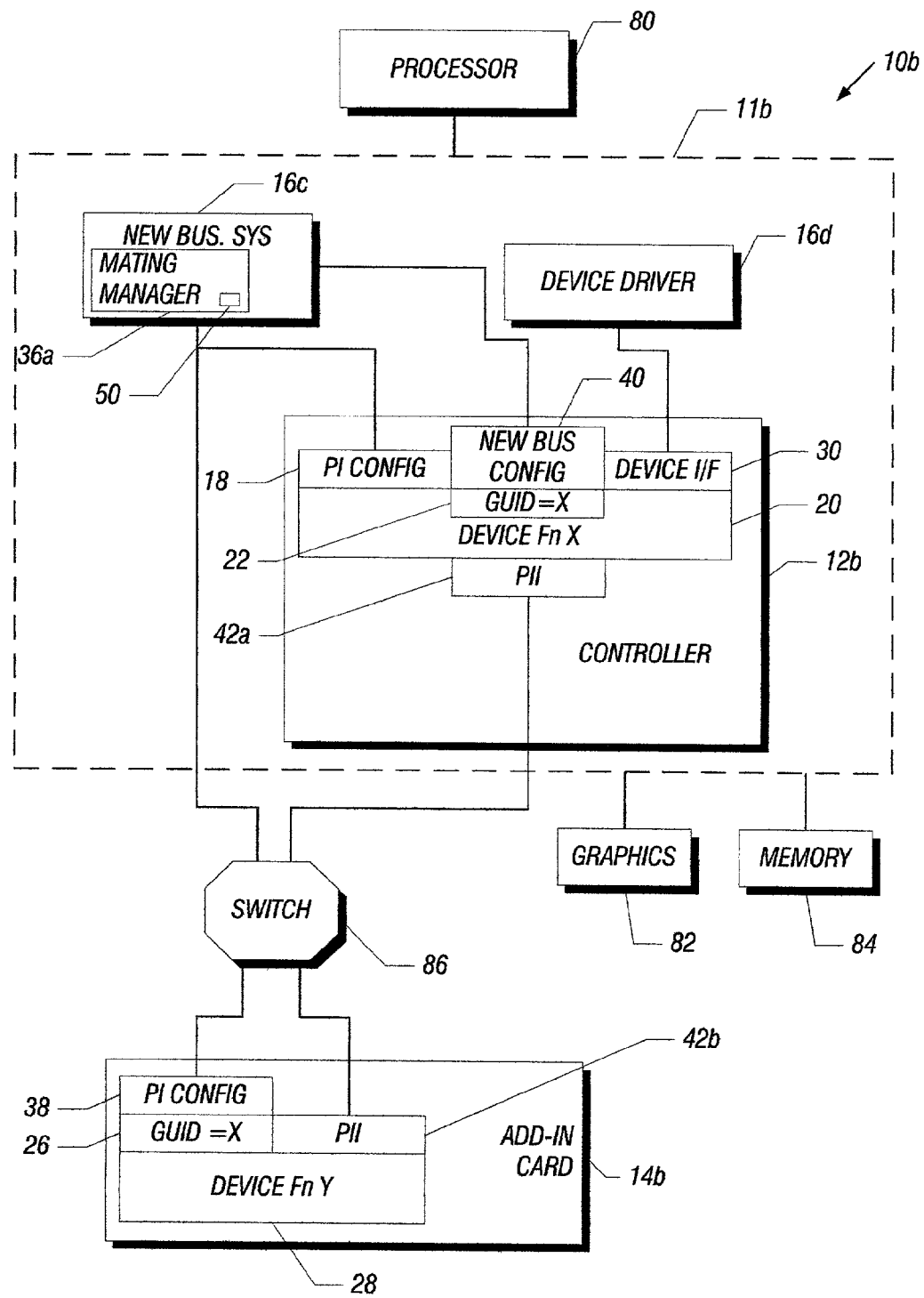
FIG. 3 is a depiction of a device corresponding to FIG. 1 adapted to a custom bus model in accordance with one embodiment of the present invention.

Referring to FIG. 3, in another embodiment of the present invention, a custom bus driver 16c may be provided to communicate directly with the add-in card 14b and the controller 12b. In such an embodiment, the mating manager 36a may be implemented within the custom bus driver 16c. The custom bus driver 16c may provide flexibility; however, it may be necessary to custom define the mating manager 36a.

Thus, the embodiment shown in FIG. 3 differs from the embodiment shown in FIG. 2 in that the mating manager 36a is resident in the bus driver 16c and therefore communicates directly with both the controller 12b and the add-in card 14a. The partial integration interface (PII) 42b interfaces between the add-in card 14b and a corresponding interface 42a on the controller 12b.

Also in FIG. 3, the bridge 11b is coupled to a processor 80, a memory 84 and a graphics device 82 in one embodiment. The add-in card 14b is coupled to the bridge 11b via a switch 86 in one embodiment of the present invention. While the embodiment shown in FIG. 3 is consistent with the so-called Third Generation I/O (3 gio) bus technology, any other bus technology may also be implemented.

The custom bus driver 16c also communicates with the configuration space 40 in the controller 12b and a partial integration space 18 in the controller 12b. Meanwhile, the conventional device driver 16d communicates through an interface 30.

In the embodiment shown in FIGS. 1-3, the mating manager 36 enumerates the partially integrated components (functions FnX and FnY for example) resident in the controller 12 and the add-in card 14 by accessing the partial integrated configuration space 18 residing at a well known offset within the controller 12. The partial integration configuration space 18 contains the partial integration, global unique identifier 22 that identifies the unique, partial integration identifier for the partially integrated platform 10. The mating manager 36 then detects the non-integrated components on the attached add-in card 14 via the existence of a partial integration space 38 within the add-in card 14.

The mating manager 36 compares the partial integration interface global unique identifier 26, from the partial integration configuration space 38 of the add-in card 14, with the partial integration, global unique identifiers 22 and the partial integration device 20 in the controller 12. If a match is found, the mating manager 36 writes the mated partial integration device bus information to the partial integration configuration spaces 18 and 38 of the controller 12 and add-in card 14, respectively. The bus information may include all the information necessary for the mated partial integration device 20, 28 components to communicate.

Figure 4:
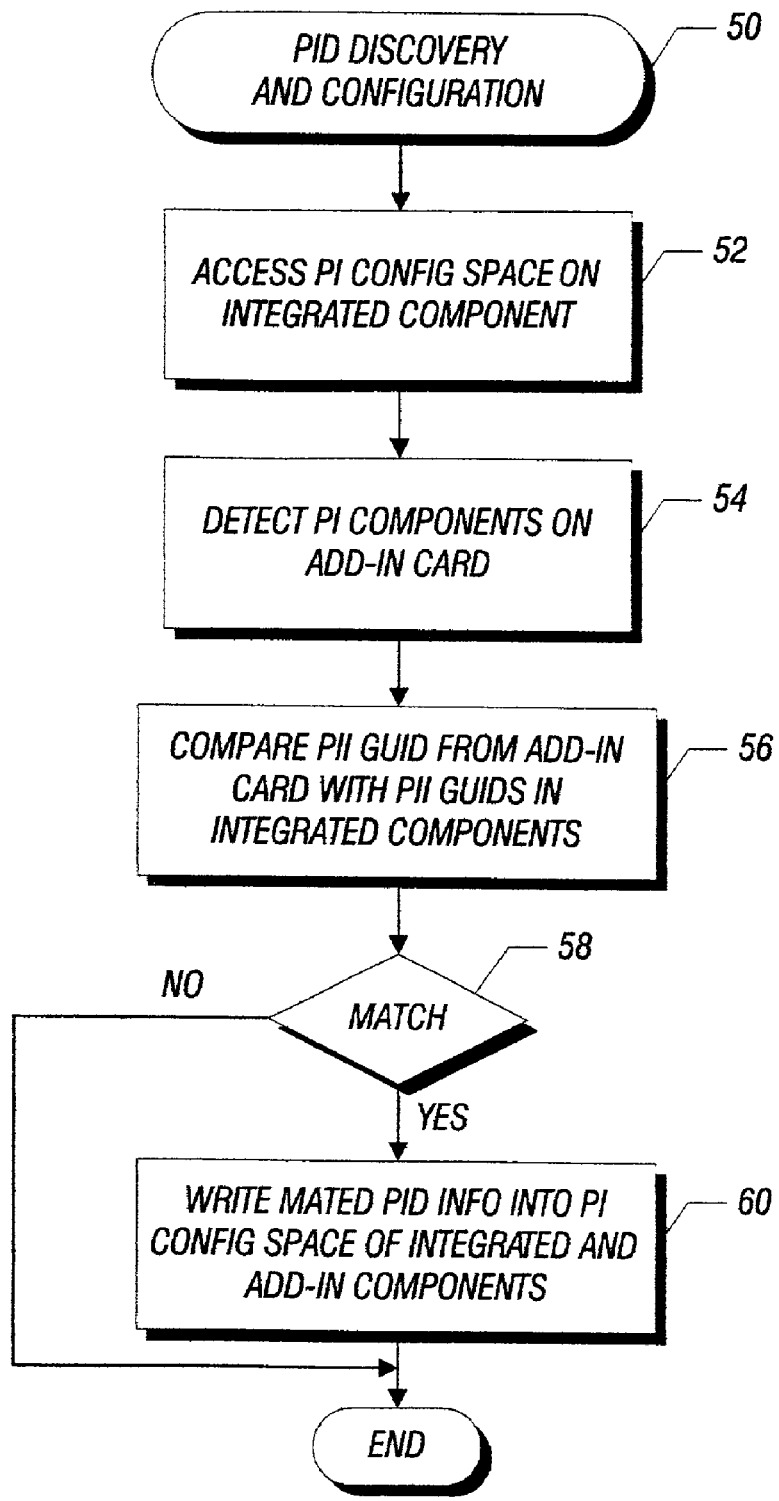
FIG. 4 is a flow chart for software in accordance with one embodiment of the present invention.

Referring to FIG. 4, the discovery and configuration code 50, in accordance with one embodiment of the present invention, may be stored in association with or merely to be accessible by the mating manager 36. The code 50 initially accesses the partial integration configuration space on the integrated component as indicated in block 52. The mating manager 36 then detects the partial integration components on the add-in card 14 as indicated in block 54. The unique identifiers from the add-in card and the integrated components are compared, as indicated in block 56.

If a match is detected at diamond 58, the mated partially integrated device information is written to the configuration space of the integrated and add-in components as indicated in block 60.

As an example of implementation of the present invention, in the embodiment shown in FIG. 3, the add-in card 14 may implement a network adapter for a wireless network such as a network compatible with the IEEE 802.11 standard. See Institute of Electrical and Electronic Engineers (IEEE) Standard for Information Technology LAN/WAN-Specific Requirements-Part II: Wireless LAN Medium Access Control (MAC) and Physical Layer (PHY) Specifications (1999). In such case, the add-in function (FnY) may be the PHY capability to implement a wireless network adapter and the integrated function (FnX) may be the MAC for the wireless network adapter.

Add-in cards or network interface cards currently support wake on local area network (LAN) functionality by filtering incoming MAC frames to decide whether the incoming frame is a special frame indicating that the entire system should be woken up. Thus, in existing add-in cards, both the MAC and PHY function is provided in the add-in card. This would appear to have some advantages in the wake on LAN situation because in such case, the add-in card can determine whether or not to wake the entire system by first testing or filtering the packet to decide it is necessary to wake up the entire system.

However, as described above, it would be desirable to partially integrate a wireless LAN function into existing platforms. In such case, the MAC may be incorporated into a chipset or otherwise incorporated into a platform at a reasonable cost and the PHY may be provided via an add-in card. However, since wake filtering is normally associated with the MAC function, this would mean that in order to test to determine whether or not a given packet is an appropriate wake packet, the entire system would have to be awoken.

A system that requires the entire operation to be awoken on each incoming packet may be power ineffective. One purpose of powering down the system until an appropriate wake packet is received is to reduce power consumption. Reduced power consumption may be particularly important in systems that are battery powered. Thus, while partial integration offers numerous advantages including more cost effective incorporation of new technologies, a problem arises with respect to achieving partial integration with effective power consumption for wireless LANs.

In accordance with one embodiment of the present invention, the device FnY 28 (for example as shown in FIG. 3) may include the PHY functionality, but in addition may include the wake packet filtering functionality as well. Thus, the wake packet filtering functionality is migrated from the MAC which corresponds to the device FnX 20 located within the host system 10b or 10, for example. Thus, the add-in card 14, 14a or 14b, provides the PHY and the wake packet filtering for implementing wake on LAN.

As a result, the testing, to determine whether a packet has been received that requires the system 10, 10a or 10b to be awoken, may be implemented in the add-in card 14. This results in better power management while still achieving the advantages of partial integration. In one embodiment, the minimum possible required wake filtering function is added to the PHY by shifting the essential components of that capability from the MAC.

Figure 5:
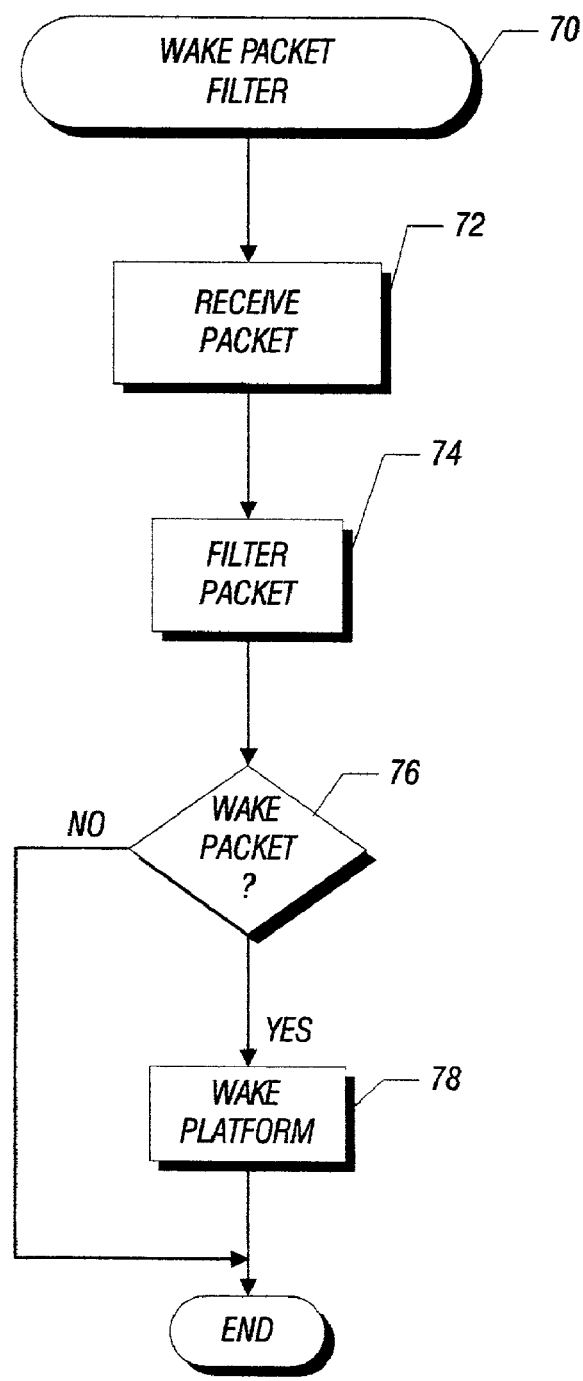
FIG. 5 is a flow chart for one embodiment of the present invention.

Referring to FIG. 5, the wake packets filter code 70 may be stored in the add-in card 14 in one embodiment. Initially, a packet is received in the add-in card 14 as indicated in block 72 in FIG. 5. The packet is filtered as indicated in block 74 to determine whether or not the packet is one of a type which necessitates the awakening from a reduced power consumption state of the host platform 10.

If so, as determined in diamond 76, the platform 10 is awakened as indicated in block 78. Otherwise, the packet is handled in the add-in card 14 and no awakening of the platform 10 is necessitated. Of course, wakening the platform 10, in some embodiments, involves causing the platform 10 to transform from a lower power consumption state to a higher power consumption state, in order to handle incoming communications as one example.

The bus interface between the MAC and PHY modules can be any available technology.

In battery powered embodiments, battery life may be extended by doing wake packet filtering in the add-on device while still proceeding the economic advantages of partial integration of wireless networking. In particular, a system that avoids unnecessary and power consumptive waking of the host system may be avoided. At the same time, partial integration of wireless networking in the host provides advantageous upgradeability.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   accessing a configuration space on a platform integrated component;
   detecting an add-in card for a platform, said add-in card intended to operate with said integrated component to implement wake packet filtering;
   comparing an identifier for said add-in card with an identifier for said integrated component; and
   if said identifiers match, writing information into the configuration spaces of the integrated component and add-in card.

2. The method of claim 1 further including enabling the add-in card to filter incoming wake packets, to determine whether it is necessary to awake a host platform and to provide an appropriate signal to wake the host platform.

3. The method of claim 1 further including coupling the add-in card to a platform.

4. The method of claim 3 further including enabling the platform to implement wireless medium access control.

5. The method of claim 3 further including providing a physical layer for wireless communications in said add-in card.

6. A processor-based system comprising:
   a processor;
   a medium access control to enable wireless communications, said medium access control not including a wake packet filtering function; and
   a mating manager to access a configuration space associated with an integrated component, detect an add-in card external to said system, said add-in card intended to operate with an integrated medium access control to provide wake packet filtering, compare an identifier for said add-in card with an identifier for said medium access control, and if said identifiers match, write information into the configuration spaces of the integrated component and add-in card.

7. The system of claim 6 wherein the add-in card coupled to said system, said add-in card including a physical layer to provide wireless communications, said add-in card also including a wake packet filtering function.

8. An article comprising a computer readable medium encoded with computer executable instructions enabling a processor-based system to:
   access a configuration space on a platform integrated component;
   detect an add-in card for a platform, said add-in card intended to operate with said integrated component to provide wake packet filtering;
   compare an identifier for said add-in card with an identifier for said integrated component; and
   if said identifiers match, write information into the configuration spaces of the integrated component and add-in card.

9. The article of claim 8 wherein the computer readable medium is further encoded with computer executable instructions that enable the processor-based system to provide a physical layer for wireless communications.

10. The article of claim 8 wherein the computer readable medium is further encoded with computer executable instructions that enable said system to avoid unnecessarily awakening a platform coupled to said system so as to reduce power consumption of said platform.

11. The article of claim 8 wherein the computer readable medium is further encoded with computer executable instructions that enable said system to implement wake packet filtering in a system not having a medium access control.

* * * * *